(12) United States Patent
Scarlata

(10) Patent No.: US 6,712,736 B2
(45) Date of Patent: Mar. 30, 2004

(54) VEHICLE START SYSTEM AND METHOD

(75) Inventor: Primo Scarlata, South Oakleigh (AU)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/734,272

(22) Filed: Dec. 11, 2000

(65) Prior Publication Data

US 2001/0006922 A1 Jul. 5, 2001

(30) Foreign Application Priority Data

Dec. 10, 1999 (AU) ............................................. 64453/99

(51) Int. Cl.$^7$ ........................... F16H 59/10; B60K 20/02
(52) U.S. Cl. ........................ 477/99; 477/102; 74/473.3
(58) Field of Search ........................ 477/99, 102, 105, 477/111; 74/473.3, 473.35, 473.19

(56) References Cited

U.S. PATENT DOCUMENTS

| | | | | |
|---|---|---|---|---|
| 3,326,315 A | * | 6/1967 | Richards ..................... 180/336 |
| 3,811,020 A | * | 5/1974 | Johnson et al. ........... 477/99 X |
| 4,051,915 A | * | 10/1977 | Behrens ..................... 477/99 X |
| 4,064,823 A | * | 12/1977 | Draxler ..................... 477/99 X |
| 4,281,526 A | * | 8/1981 | Lipschutz ................. 477/99 X |
| 4,362,516 A | * | 12/1982 | Lyons ....................... 477/99 X |
| 4,425,620 A | * | 1/1984 | Batcheller et al. ........ 477/99 X |
| 4,449,495 A | * | 5/1984 | Fiala ........................ 477/99 X |
| 5,129,494 A | * | 7/1992 | Rolinski et al. .......... 477/99 X |
| 5,445,575 A | * | 8/1995 | Sundeen ..................... 477/99 |
| 5,653,659 A | * | 8/1997 | Kunibe et al. .............. 477/111 |
| 6,027,426 A | * | 2/2000 | Holman ........................ 477/99 |
| 6,043,568 A | * | 3/2000 | Matsumoto et al. ........ 307/10.5 |
| 6,043,752 A | * | 3/2000 | Hisada et al. .............. 340/5.26 |
| 6,093,980 A | * | 7/2000 | Yamamoto et al. ........ 307/10.5 |

FOREIGN PATENT DOCUMENTS

JP 360248443 * 12/1985

* cited by examiner

Primary Examiner—Ha Ho
(74) Attorney, Agent, or Firm—Kenyon & Kenyon

(57) ABSTRACT

A vehicle start system including a gear selector moveable to change from one of a plurality of drive conditions to a Start condition, for effecting Start-up of the vehicle engine. The system unifies the functions of a conventional gear shifter and an ignition switch assembly, A method of starting a vehicle utilizing the system is also described.

15 Claims, 3 Drawing Sheets

VEHICLE START SYSTEM AND METHOD

FIELD OF THE INVENTION

The present invention relates to a vehicle start system and method.

BACKGROUND INFORMATION

A known vehicle start system utilises a transponder key in combination with an ignition switch assembly or separate start button. Once an authorisation check of the transponder has been successfully completed, (assuming a passive entry system is installed) the vehicle is placed in a "Passive Go" condition where actuation of the ignition switch or start button effects start-up of the vehicle engine. The vehicle gears may then be engaged for driving. Gear selection is usually undertaken independently of the start procedure except, in some cases, where a gear selector is required to be in a predetermined position such as "P", indicating a "Park" selection for an automatic vehicle.

SUMMARY OF THE INVENTION

The present invention seeks to provide a more functionally unified vehicle start system and method.

In accordance with the present invention, there is provided a vehicle start system that includes a gear selector moveable to change from one of a plurality of drive conditions to a Start condition, for effecting Start-up of the vehicle engine.

The gear selector includes a selector lever and return arrangement for urging the selector lever out of the Start condition.

The sensor is provided to detect whether the selector lever is moved into the Start condition.

The sensor is in the form of a switch which is engaged by movement of the lever into the Start condition.

The return arrangement includes a spring-biased plunger which is adapted to be resiliently displaced by movement of the lever into the Start condition. The plunger is arranged to be engaged by the lever. Alternatively, the plunger is arranged internally of a gear box of the vehicle and positioned so as to engage a push rod associated with the lever. In either case, the switch is actuated by displacement of the plunger.

The system includes an ignition unit for starting the vehicle engine, upon receipt of an indication from the sensor that the selector lever has been moved to the Start condition.

The system includes a transponder key and a controller arranged to check the transponder for appropriate authorisation, the controller being adapted to selectively enable the unit, upon confirmation of the appropriate authorisation, to allow the engine to be started.

The vehicle is provided with automatic transmission and the Start condition is accessed by moving the lever from a "P" (PARK) position. Alternatively, the vehicle is provided with manual transmission and the Start position is accessed by moving the lever from an "N" (NEUTRAL) position.

The system includes a further sensor arranged to determine whether a brake of the vehicle is in an engaged condition, and wherein the ignition unit is enabled only if the engaged condition is detected.

The gear selector is configured to provide a Stop condition, where the vehicle engine is turned off.

In another aspect, there is provided a method for starting a vehicle including moving a gear selector to change from one of a plurality of drive conditions to a Start condition for effecting start-up of the vehicle engine.

The gear selector includes a selector lever which is biased so as to be urged out of the Start condition and the method includes holding the lever in the Start condition, against the bias, until the engine is started, followed by return of the lever to one of the drive conditions.

The method includes providing a transponder key for authorising start of the vehicle engine.

The method includes engaging a brake of the vehicle, in combination with movement of the selector into the Start condition.

The method further includes moving the selector into a Stop condition. The positioning of the selector for the Stop and Start conditions is the same, with the Start condition function of the selector being disabled after start of the vehicle.

DETAILED DESCRIPTION

Figure 1:
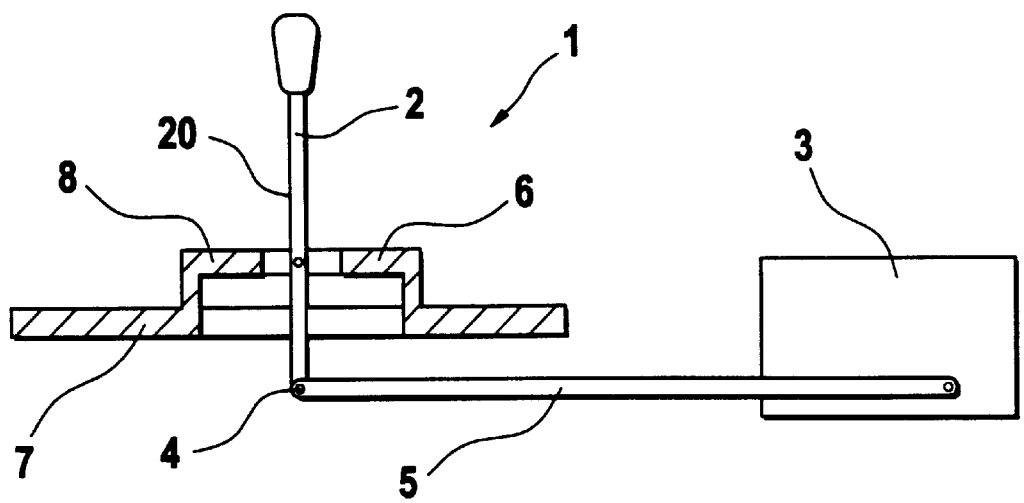
FIG. 1 is a diagrammatic side view of a gear selector coupled to a gear box.

A vehicle Start system 1 is shown in FIG. 1 as including a gear selector 2, in the form of a selector lever 20, coupled to a gear box 3 via a pivot connection 4 and a push rod 5. The selector 2 passes through a housing 6 which is mounted to a vehicle floor 7.

Figures 2A, 2B, 2C:
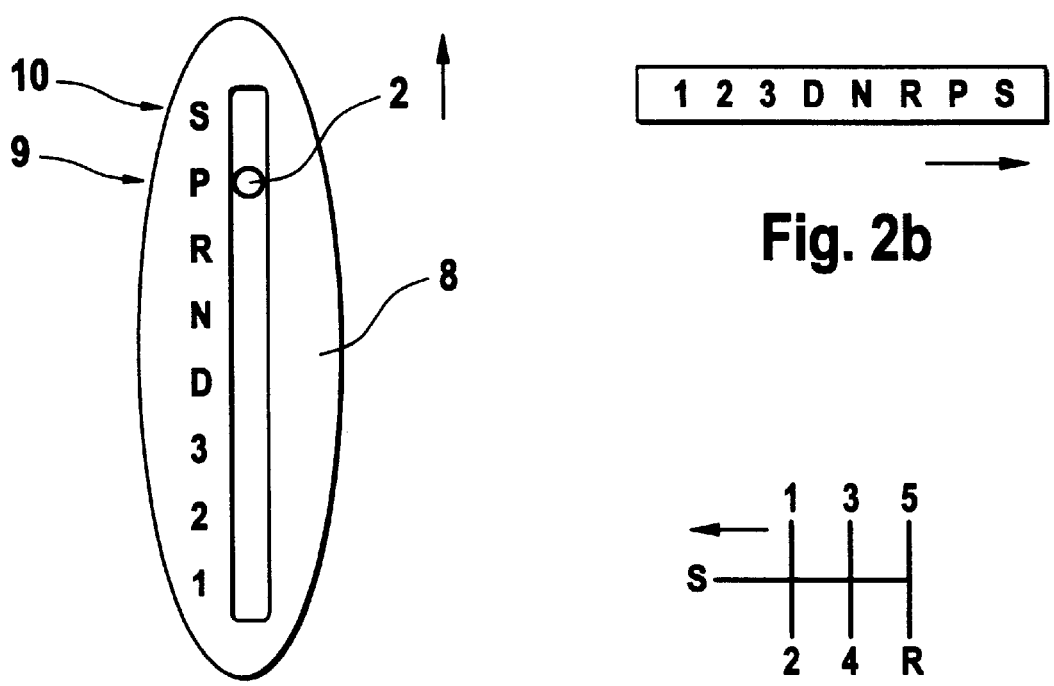
FIG. 2a illustrates a first possible arrangement of gear selector positions.
FIG. 2b illustrates a second possible arrangement of gear selector positions.
FIG. 2c illustrates a third possible arrangement of gear selector positions.

The housing 6 may include a display panel 8, as shown in FIG. 2a, which indicates a number of conventional gear selection positions 9 for drive conditions such as "P", indicating a Park condition of the vehicle. In addition, a Start condition indicated by " S" is provided for at position 10. By moving the gear selector 2 into the Start condition, the vehicle engine may be started, without the need for a separate ignition switch assembly.

The selector positions as shown in FIG. 2a are in a configuration suitable for a vehicle with automatic transmission, where the gear selector is mounted through the vehicle floor 7. In the case of a column mounted gear selector an alternative gear position arrangement such as shown in FIG. 2b may be adopted. As a further alternative, the gear position configuration as shown in FIG. 2c may be used in the case of a vehicle with manual transmission such that the Start condition "S" is accessed from the neutral gear position.

Figure 3:
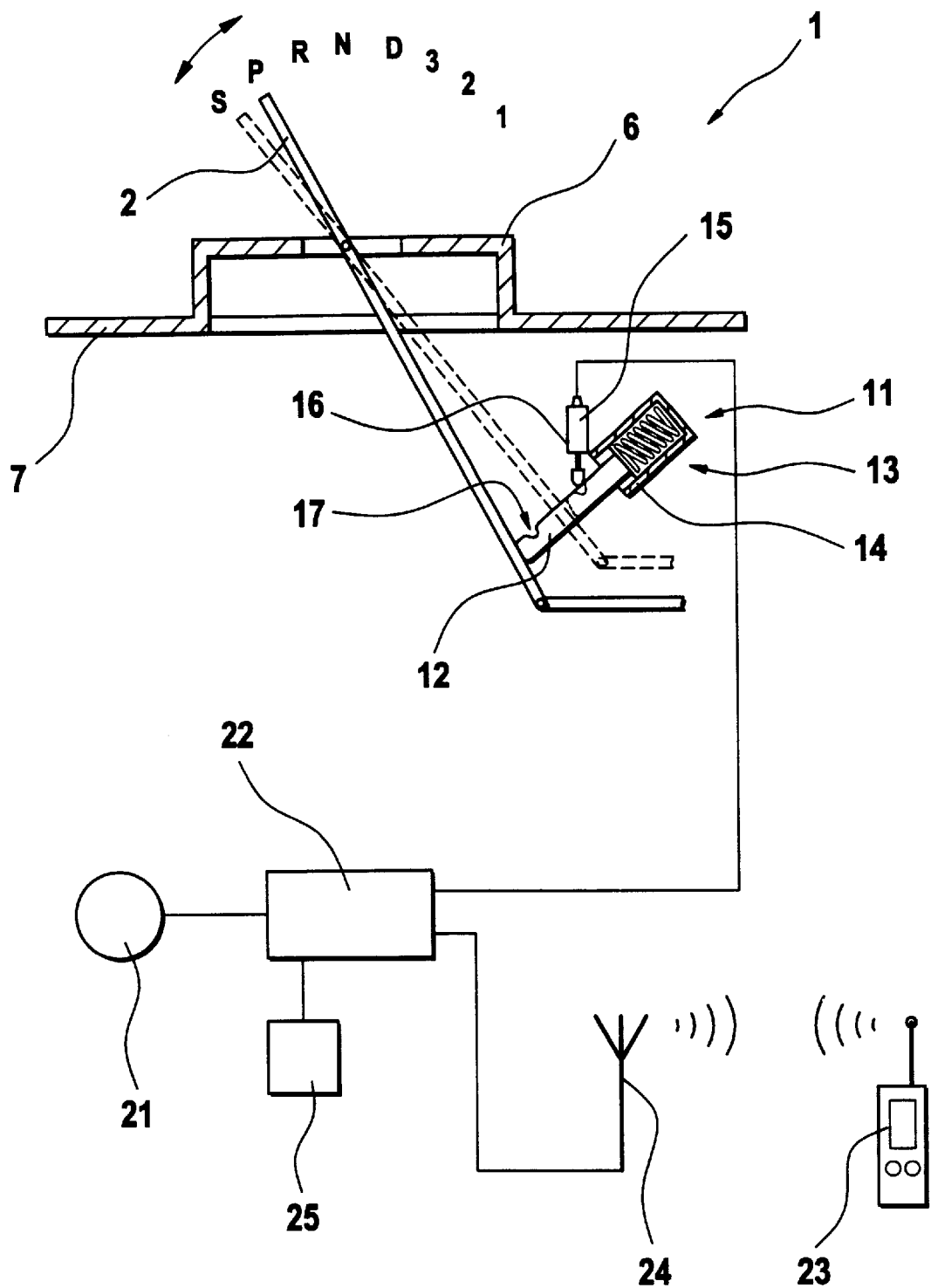
FIG. 3 is a diagrammatic side view of the gear selector of FIG. 1, illustrating movement between a Park position and a Start position.

Referring now to FIG. 3, the system 1 is shown as including a return arrangement 11 in the form of a plunger 12 coupled to a spring 13 which is mounted in a guide 14 arranged for receipt of the plunger 12. The plunger 12 is positioned so as to be in abutment with the selector 2, when the selector 2 is in the Park position "P". Movement of the selector between the Park and Start conditions forces the plunger against the resilient bias of the spring 13. After starting the vehicle, the gear selector may be released to allow the spring bias to automatically return the selector to the initial Park condition. Any other suitable electronic or mechanical form of returning the selector to the Park position may, of course, be used in place of the spring biased plunger.

The system also includes a sensor 15 in the form of switch 16 which, in the specific case where the plunger 12 is used to return the lever, may be triggered by registering with a recess 17 in the plunger 12 when the plunger is advanced into the guide 14 by movement of the gear selector 2 into the Start condition.

Figure 4:
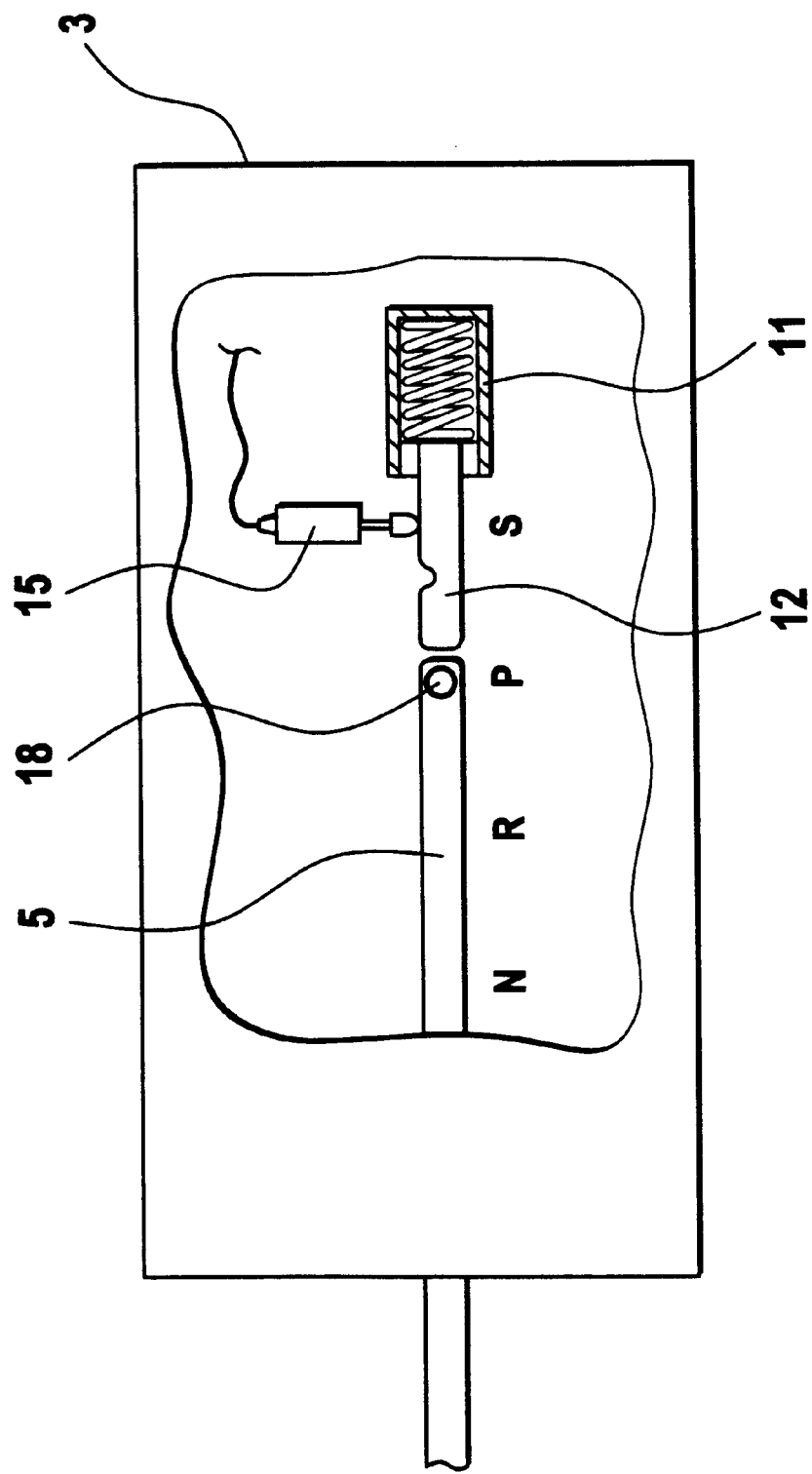
FIG. 4 illustrates a possible configuration of the gear box of FIG. 1.

As an alternative to the configuration shown in FIG. 3, the bias arrangement 11 and sensor 15 may instead be provided in the gear box itself, as illustrated in FIG. 4 where the plunger 12 is shown in abutment with an end 18 of the push rod 5 such that movement of the gear selector from the Park to the Start/Stop position results in axial movement of the plunger 12 so as to trigger the sensor 15 in a manner similar to that described in relation to FIG. 3.

In either case, when the gear selector 2 is detected as being in the Start condition, the switch 16 outputs a signal for actuation of an ignition unit 21 for starting the engine. The output signal may firstly be transmitted to a controller 22 which ensures that other pre-determined conditions are satisfied before enabling the ignition unit 21. For example, the system may also include a transponder key 23 which is preferably carried by the driver and which may be interrogated by the controller 22 via antenna 24 to verify that appropriate authorisation is present for starting the vehicle. An additional input to the controller may be from a further sensor 25 which determines whether a foot brake or hand brake of the vehicle is in an engaged condition prior to allowing the vehicle to be started.

Once the vehicle has been started, the start function associated with the "S" position may be disabled either electronically or mechanically to avoid the possibility of the ignition unit, such as a starter motor or the like, from continuing to be engaged once the vehicle engine has actually started. The "S" position may then be used as a "Stop" position whereby return of the gear selector to the position 10 stops the vehicle engine.

As may be appreciated from the above, the system of the present invention unifies the ignition function of a vehicle with a conventional gear selector function to provide an easy-to-use and simplified assembly as compared to the conventional gear selector and ignition switch assembly which are operated independently and constructed separately. It should also be appreciated that the gear selector, as described above, may vary in construction, as appropriate, and indeed may even be in the form of a toggle switch selector.

The system and method have been described by way of non-limiting example only and many modifications and variations may be made thereto without departing from the spirit and scope of the present invention described.

What is claimed is:

1. A vehicle start system, comprising:
    a gear selector moveable to change from one of a plurality of drive conditions to a start condition, for effecting start-up of a vehicle engine, wherein:
    a positioning of the gear selector for a stop condition and the start condition is the same, and
    the gear selector includes a selector lever and a return arrangement for urging the selector lever out of the start condition.

2. The vehicle start system as claimed in claim 1, further comprising:
    a sensor for detecting whether the selector lever is moved into the start condition.

3. A vehicle start system as claimed in claim 2, wherein the sensor includes a switch that is engaged by movement of the selector lever into the start condition.

4. A vehicle start system as claimed in claim 2, further comprising:
    an ignition unit for starting the vehicle engine, upon receipt of an indication from the sensor that the selector lever has been moved to the start condition.

5. A vehicle start system as claimed in claim 4, further comprising:
    a further sensor for determining whether a brake of a vehicle is in an engaged condition, wherein the ignition unit is enabled only if the engaged condition is detected.

6. A vehicle start system as claimed in claim 5, further comprising:
    a transponder key; and
    a controller for checking the transponder key for an appropriate authorisation, the controller being adapted to selectively enable the ignition unit, upon confirmation of the appropriate authorisation, to allow the vehicle engine to be started.

7. A vehicle start system as claimed in claim 6, wherein the vehicle is provided with an automatic transmission and the start condition is accessed by moving the selector lever from a park position.

8. A vehicle start system, comprising:
    a gear selector moveable to change from one of a plurality of drive conditions to a start condition, for effecting start-up of a vehicle engine, wherein:
    the gear selector includes a selector lever and a return arrangement for urging the selector lever out of the start condition, and
    the return arrangement includes a spring-biased plunger that is adapted to be resiliently displaced by a movement of the selector lever into the start condition.

9. A vehicle start system as claimed in claim 8, wherein the spring-biased plunger is arranged to be engaged by the selector lever.

10. A vehicle start system as claimed in claim 8, further comprising:
    a push rod associated with the selector lever, wherein:
    the spring-biased plunger is arranged internally of a gear box of a vehicle and positioned so as to engage the push rod.

11. A method for starting a vehicle, comprising the steps of:
    moving a gear selector to change from one of a plurality of drive conditions to a start condition for effecting a start-up of a vehicle engine, wherein:
    a positioning of the gear selector for a stop condition and the start condition is the same, and
    the gear selector includes a selector lever arranged to be urged out of the start condition;
    holding the selector lever in the start condition until the vehicle engine is started; and
    following the holding step, returning the selector lever to one of the plurality of drive conditions.

12. A method as claimed in claim 11, further comprising the step of:
    engaging a brake of the vehicle and moving the selector lever into the start condition.

13. A method as claimed in claim 11, further comprising the step of:

moving the selector lever into a stop condition.

14. The vehicle start system as claimed in claim 11, further comprising:

providing a transponder key for authorising a start of the vehicle engine.

15. A method for starting a vehicle, comprising the step of:

moving a gear selector to change from one of a plurality of drive conditions to a start condition for effecting a start-up of a vehicle engine, wherein the gear selector includes a selector lever arranged to be urged out of the start condition;

holding the selector lever in the start condition until the vehicle engine is started;

following the holding step, returning the selector lever to one of the plurality of drive conditions;

moving the selector lever into a stop condition, wherein a positioning of the selector lever for the stop condition and the start condition is the same; and disabling a start condition function of the selector lever after a start of the vehicle.

* * * * *